Figure 1:
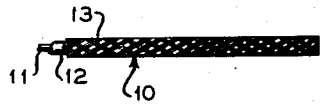

July 13, 1954 A. U. KAPPES 2,683,274
WIRE UNBRAIDING AND STRAIGHTENING DEVICE
Filed March 8, 1951

INVENTOR.
A. U. KAPPES
BY
ATTORNEY

Patented July 13, 1954

2,683,274

UNITED STATES PATENT OFFICE 2,683,274

WIRE UNBRAIDING AND STRAIGHTENING DEVICE

Arthur U. Kappes, Evansville, Ind.

Application March 8, 1951, Serial No. 214,530

1 Claim. (Cl. 15—106)

This invention relates to the manipulation of metal and more particularly to a device for straightening relatively fine strands of wire.

In the fabrication of electronic and other electrical equipment it is often necessary to utilize what is commonly known as shielded cable or shielded conductors. These cables or conductors comprise one or more conducting elements surrounded by insulation which in turn is covered by a shield composed of relatively fine strands of wire enclosing the insultion in a relatively tight braid. This braided shield is normally utilized to prevent interference with the current flowing in the conductor by stray electrical fields and one common use thereof is in the grid leads of the low level stages of audio amplifiers to prevent or minimize the pick up of hum or other extraneous noises.

Heretofore the use of shielded cable has proven extremely troublesome due to the fact that a portion of the shield must be removed in order to uncover the insulation and permit stripping of the same in order to make an electrical connection to the conductor of the cable. Likewise, it is usually necessary to make a connection from the shield to the ground side of the circuit or other appropriate place and, consequently, it has been necessary to provide some means for making an adequate electrical connection to the shield. This has been a time-consuming operation and in most instances the shield is unbraided by utilizing a sharp pointed tool and merely straightening the wires forming the braid one by one. Obviously, such time-consuming methods find no place in the present day high speed production and, consequently, it is proposed by this invention to provide a relatively simple, hand-operated tool which will quickly accomplish the desired result.

It is therefore an object of this invention to provide a tool for straightening the relatively fine strands of wire which form the braid of a shielded cable.

It is a further object of this invention to provide a device for straightening the strands of wire forming the braid of a shielded cable which device may be conveniently held and operated by one hand while the cable is held by the other hand.

It is a further object of the invention to provide a tool for straightening the strands forming the braid of a shielded cable in order to permit stripping of the insulation from the cable and also to permit gathering of the strands forming the braid to be twisted together, thus forming a pigtail for facilitating connecting the braid or shield to a part of an electrical circuit.

It is a further object of the invention to provide a tool for straightening the strands of wire forming the braid of a shielded cable, which tool may be economically manufactured of relatively simple and easily obtainable parts and materials and one which is relatively rugged and will not be injured by the normal abuse to which such tools are subjected when placed in tool-boxes with other relatively heavy tools.

Figure 2:
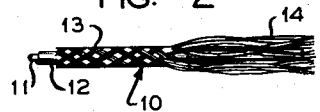
Figure 3:
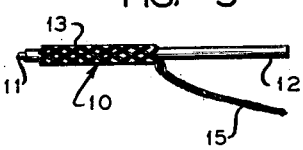
Figure 4:
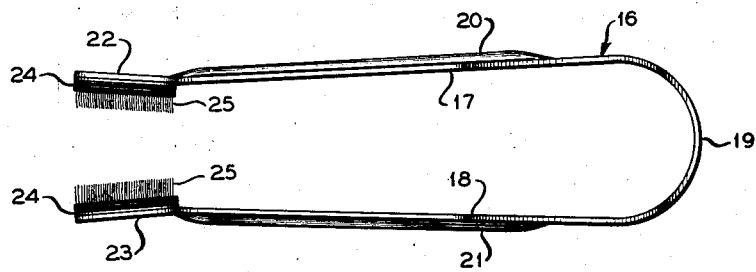
Figure 5:
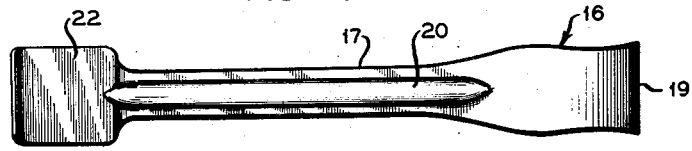
Figure 6:
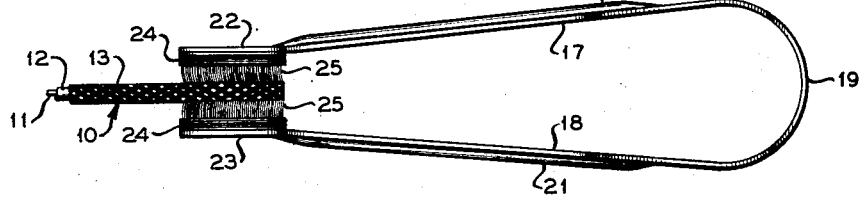
Figure 7:
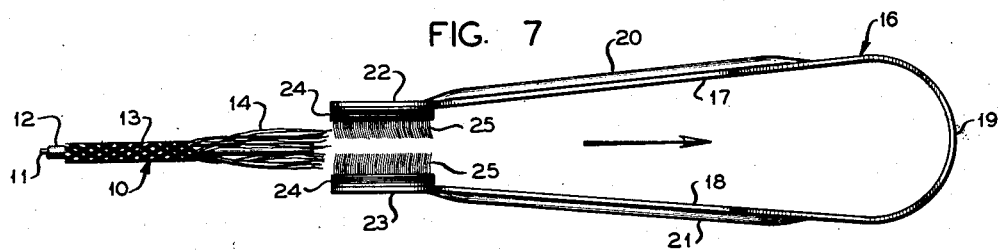

Further objects and advantages of the invention will be apparent from the following description taken in conjunction with the accompanying drawings, wherein:

Fig. 1 is an elevational view showing a shielded cable with which the tool of the present invention may be utilized;

Fig. 2, an elevational view similar to Fig. 1 but showing the strands of the shield straightened after operation thereon by the tool of this invention;

Fig. 3, an elevational view similar to Figs. 1 and 2 but showing the strands of the shield twisted to form a pigtail;

Fig. 4, a side elevational view showing the tool of this invention;

Fig. 5, a top plan view of the tool shown in Fig. 4;

Fig. 6, a side elevational view of the tool shown in Fig. 4 and applied to a shielded cable just prior to starting the wire straightening operation; and Fig. 7, a side elevational view showing the tool of this invention after completing the wire straightening operation and showing the strands of the shield after such treatment.

With continued reference to the drawing, there is shown in Fig. 1 a shielded cable 10 having a conductor 11 covered by insulation 12 which in turn is enclosed in a shield 13 formed of relatively fine strands of copper or other suitable wire braided together to form a tubular shield.

Prior to connecting the conductor 11 into an electrical circuit it is necessary to remove a portion of the shield 13 in order to uncover the insulation 12 and this is accomplished by separating the individual strands 14 of the shield 13, as shown in Fig. 2, in order to permit removal of these strands or permit the twisting of the same to form a pigtail, as shown at 15 in Fig. 3. Pigtail 15 is useful for connecting the shield 13 to a part of the electrical circuit in order to provide a ground connection for the shield.

With particular reference to Fig. 4, the tool of this invention comprises a generally U-shaped handle member 16 having spaced legs 17 and 18 connected by a generally semi-circular resilient portion 19. Legs 17 and 18 are provided with embossed ribs 20 and 21 to impart rigidity thereto. Legs 17 and 18 terminate at their free ends in substantially rectangular flat jaw portions 22 and 23, respectively. The legs 17 and 18 and connecting portion 19 may be formed of resilient material or only the connecting portion may be formed of such material and when not in use the jaw portions 22 and 23 are spaced from each other as shown in Fig. 4. If desired, however, the legs 17 and 18 may be pivotally connected together and resilient means provided for urging them apart.

The jaw portions 22 and 23 serve to receive and carry wire straightening means in a form of a plurality of layers of fabric 24 which serve to carry a plurality of teeth 25 projecting inwardly therefrom, these teeth being slightly bent as clearly shown in the drawing and constituting what is normally known as "card clothing." Cards of this nature are also commonly used in tools for cleaning files. The layers of fabric 24 carrying the teeth 25 are secured to the jaw portions 22 and 23 by a suitable adhesive or by any other desired means. It will be noted from an inspection of the drawing that teeth 25 are bent rearwardly toward the connecting portion 19.

In use the handle 16 of the tool is grasped in the hand of the operator and the shielded conductor 10 is placed between the jaw portions 22 and 23 and these jaw portions moved toward each other by squeezing the spaced leg portions 17 and 18 to engage the teeth 25 with the strands 14 of the shield 13. Movement of the tool in the direction of the arrow in Fig. 7 serves to straighten the strands 14 of the shields 13 by the action of the teeth 25 engaging these strands. This operation is repeated while rotating the cable 10 until the strands 14 are separated for a sufficient distance, as shown in Fig. 2 of the drawing. This completes the operation of straightening the strands 14 of the shield 13 and these strands may then be either cut away or twisted into a pigtail 15, as shown in Fig. 3.

The principles of this invention may be conveniently utilized to provide a tool adapted for mounting on a bench or the like and such a tool might well include a base portion adapted to be secured to the bench, this base portion carrying one of the jaw members. The other jaw might well be pivotally mounted on the base member or might be slidable with relation thereto on upstanding rods or the like, this movable jaw being normally urged away from the jaw mounted on the base portion by suitable spring means.

The straightening teeth would be mounted on the inner surfaces of these jaws in opposed relationship and in this case instead of moving the tool with relation to the shielded cable the cable would be positioned between the jaws of the tool which would be moved into contact with the shield and the cable then moved with relation to the tool to straighten the strands of the shield. Such a tool might well find use in the production line of a factory whereas the tool specifically described above is primarily intended for use by service men or repair men and the like, although such a tool may as well be used in production work.

It will be seen that by the above invention there has been provided a relatively simple and inexpensive tool for efficiently operating upon the shield of a shielded cable in order to properly prepare this cable for use in electrical circuit.

It will be obvious to those skilled in the art that various changes may be made in the invention without departing from the spirit and scope thereof and therefore the invention is not limited by that which is shown in the drawings and described in the specification but only as indicated in the appended claim.

What is claimed is:

A tool for unbraiding and straightening the wires of a shielded conductor, a U-shaped resilient handle with opposed jaws at the ends thereof adjustable towards and away from each other, a plurality of fine stiff teeth extending from each jaw toward the opposite jaw, said teeth being inclined in the direction of the bight of the handle, each of said jaws being of sufficient dimensions that the teeth may engage and straighten strands of various sizes moving between the jaws and away from the bight of the handle.

References Cited in the file of this patent

UNITED STATES PATENTS

| Number | Name | Date |
|---|---|---|
| 438,098 | Colton | Oct. 7, 1890 |
| 565,554 | Mills | Aug. 11, 1896 |
| 753,970 | Foster | Mar. 8, 1904 |
| 1,065,679 | Gregson et al. | June 24, 1913 |
| 1,674,236 | Bauer | June 19, 1928 |
| 1,905,399 | Wagner | Apr. 25, 1933 |
| 2,205,674 | Schroeder | June 25, 1940 |
| 2,419,748 | Weber et al. | Apr. 29, 1947 |

FOREIGN PATENTS

| Number | Country | Date |
|---|---|---|
| 289,626 | Great Britain | May 3, 1928 |